United States Patent Office 3,584,343
Patented June 15, 1971

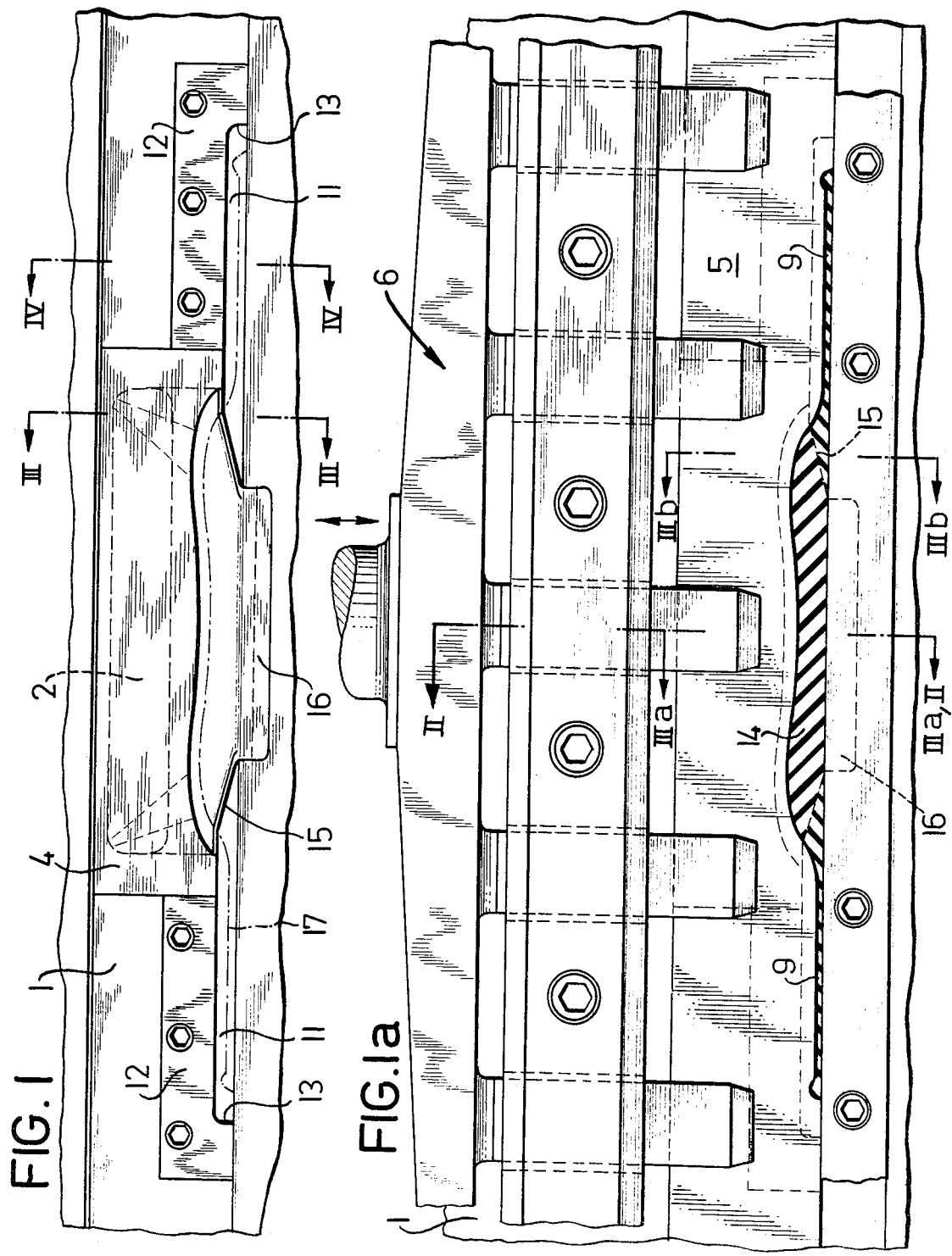

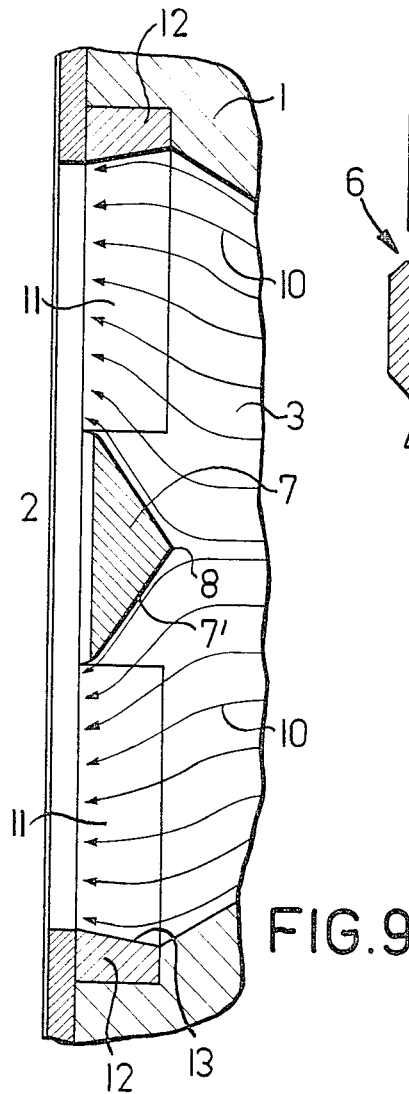
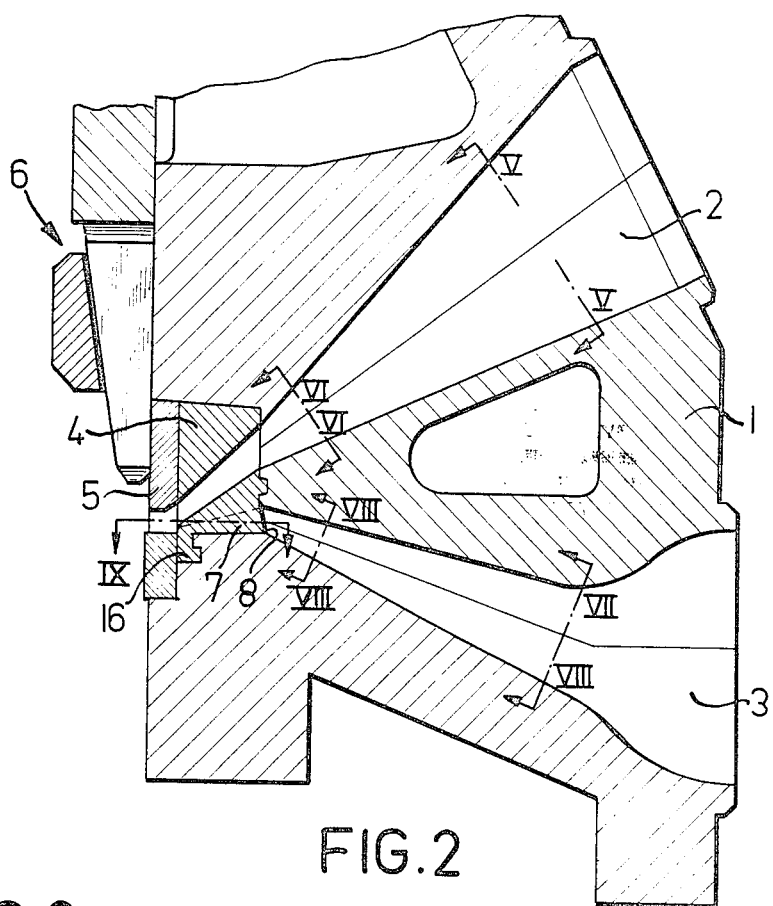
FIG. 9
FIG. 2

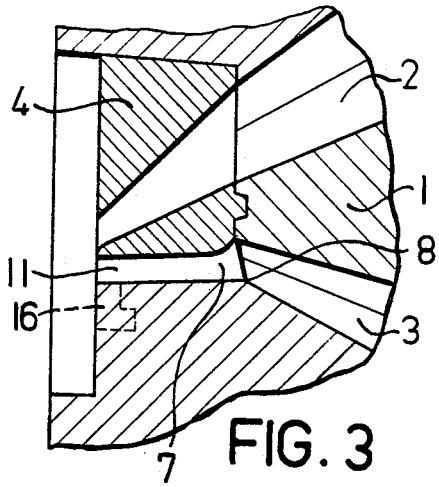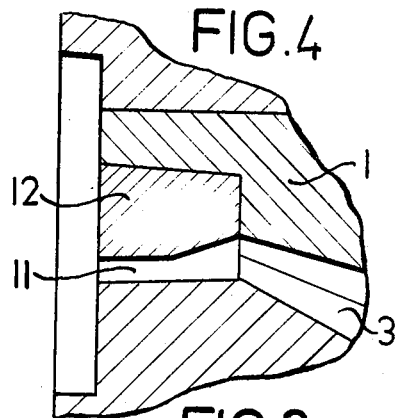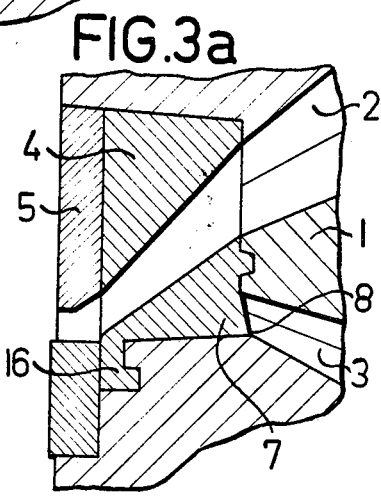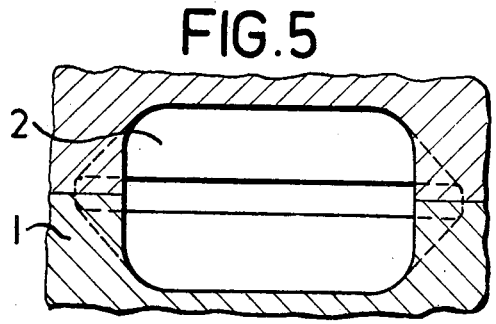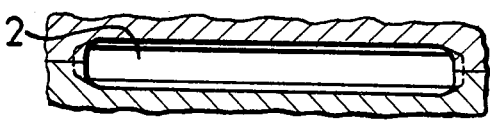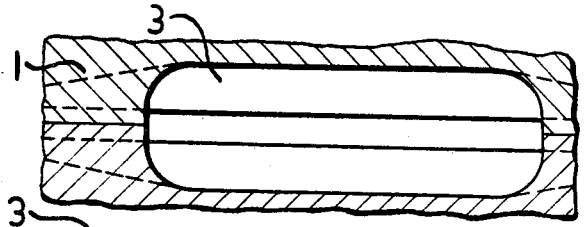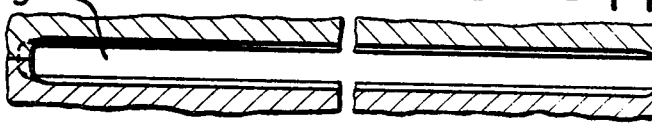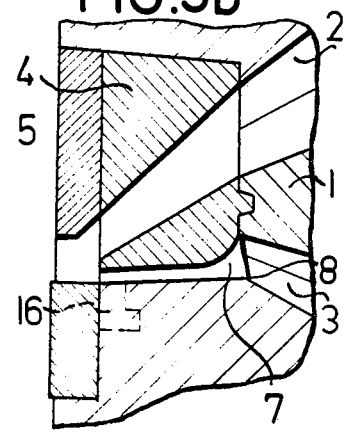
INVENTOR
WOLFGANG KOHLEPP
GÜNTER MEIER
HEINZ MOELLER
GERHARD DEPPE

3,584,343
EXTRUSION HEAD FOR COMPOSITE PROFILES, ESPECIALLY TREAD STRIPS FOR TIRES
Wolfgang Kohlepp and Günter Meier, Ahlem, Heinz Moeller, Apelern, and Gerhard Deppe, Hannover-Bothfeld, Germany, assignors to Continental Gummi-Werke Aktiengesellschaft, Hannover, Germany
Filed Nov. 1, 1968, Ser. No. 772,655
Claims priority, application Germany, Nov. 2, 1967, P 17 29 599.7
Int. Cl. B29f 3/04
U.S. Cl. 18—13
7 Claims

ABSTRACT OF THE DISCLOSURE

An extrusion head for articles of rubber and rubber-like materials which has first and second passage means for respectively conveying therethrough different materials, and in which a pre-templet directs the flow of the second passage means to flow to lateral portions of a finish-templet means while the flow from the first templet passage means passes to a section in the first templet means which is between said lateral portions.

---

The present invention relates to an injection or extrusion head for profiles of rubber or rubber-like material composed of adjacent parallel strands of different materials, especially for tire tread strips, the extrusion head comprising superimposed flow passages sealed relative to each other and an exchangeable finish-templet.

Frequently it is described to inject profiles of materials with different properties. In particular, in connection with the preparation of pneumatic vehicle tires, it is desired that the tread surface area consist of a rubber mixture which is particularly wear-resistant and skid-resistant. Since the lateral portions of the tire are subjected to other stresses than the tread strip, it is desired that these lateral portions are flexible and tear-resistant. As a result thereof, it is necessary, when injecting tread strips with sections for the above mentioned lateral portions, to provide different rubber mixtures. A core-free and tension-free inspection of the profiles at the same time, especially of the tread strip portions at the seam requires a sufficient compression at said seams and also requires to equalize as far as possible the flow velocities of the different mixtures of the materials.

It is an object of the present invention to provide an injection head which will have a geometrically simple and flow technically favorable shape of the flow or injection passages and can be produced in a simple manner.

It is another object of this invention to provide an injection head as set forth in the preceding paragraph, the main flow passages of which will be suitable for all desired profiles while, in spite of the geometrically simple shape of the flow passages, it will be possible by simple technical means to affect the adaption of the different profile cross-sections.

These and other objects and advantages of the invention will appear more clearly from the following specification in connection with the accompanying drawings, in which:

FIG. 1 is a front view of the injection head, with inserts and pre-templet, according to the invention. FIG. 1a is another view of the injection head showing cross-sectional lines II–II, IIIa–IIIa; and IIIb and IIIb providing basis for cross-sectional views of FIGS. 2, 3a and 3b, respectively.

FIGS. 3–4, illustrate different cross-sections through the injection head according to FIG. 1 with main flow passages, pre-templet and finish-templet, said sections being taken along the lines III—III and IV—IV of FIG. 1 respectively.

FIGS. 5–8 represent cross-sections through the main flow passages of the injection head according to FIG. 2, said sections being taken along the lines V—V, VI—VI, VII—VII and VIII—VIII of FIG. 2 respectively.

FIG. 9 shows the course of the flow lines according to FIG. 2 and is a section taken along the line IX—IX of FIG. 2.

An injection head according to the present invention is characterized primarily in that the flow passages having approximately rectangular cross-section decrease stepwise in cross-section toward their exit while between the exit opening of the flow passages and the finish-templet an exchangeable pre-templet is provided for the superimposed flow passages which pre-templet has a passage opening which is so designed that the pre-templet can be used for a plurality of finish-templets with differently dimensioned passage openings. Such a design of the flow passages yields a cross-section which gradually decreases to the entrance into the pre-templet while dead corners and thus unnecessary diverging and damming-up of the flow threads of the injection material will be avoided. With the flow velocities for the tread strips and the lateral portions equalized as far as possible, the injection material flows into the pre-templet while the areas, where the profiles of the tread strip preformed by the pre-templet meet with the lateral portions, are determined by the pre-templet. The pre-templet is universally designed for a certain range of sizes of tread strips to be injected so that when selecting another tire size, it is merely necessary to exchange the finish-templets. The assembly time is thus rather short and only one templet has to be exchanged for a certain range of sizes.

Preferably, at both sides of the pre-templet and in the plane thereof there are provided exchangeable insert members between the exit opening of the flow passages and the finish-templet. This design of the pre-templet prevents a sharp deviation or diversion of the flow at the outer corners of the lateral portions of the tread strips. Advantageously, also the insert members are provided with passage openings which decrease toward the passage exit in a stepless manner.

It is advantageous to seal the pre-templet by a protrusion the edges of which widen toward the passage exit while the cross-section of the protrusion is of triangular shape with the tip of the triangle pointing in the direction against the flow.

In view of this design, the central flow in the lower passage is sealed so that no uncontrollable flow of the mixture for the lateral portions can enter the tread strip proper. The shape of the surface seal according to the invention prevents dead corners and aids a flow favorable soft diversion of the flow threads toward the lateral exit passages of the pre-templet. Advantageously, the pre-templet is provided with a blocking strip which is substantially angularly shaped. As a result thereof, also at high injection pressures, a lifting off of the pre-templet and thereby the entry of the material for the lateral portions into the tread strip will be prevented.

Referring now to the drawings in detail, the injection head is composed substantially of three main portions, namely a main head 1 with the flow passages 2 and 3, a pre-templet 4, and a finish-templet 5 which latter can be clamped fast by means of a cam 6 adjustable as to height. The flow passages 2, 3 extend in a funnel-shape manner toward the pre-templet 4 in such a way that the cross-section of said flow passages, as indicated in FIGS. 5, 6, 7 and 8, gradually decreases and its width increases. This rectangular shape of the cross-sectional narrowing of the flow passage 2, 3 aids in a continuous increase of the compression of the injection material which is fed by two worms (not shown). Unnecessary deviations or diversions of the flow and damming up of the flow in the flow passages 2, 3 will be prevented in this manner. The flow passages 2, 3 may, of course, also have different continuously decreasing cross-sections, as for instance oval or circular cross-sections, in conformity with the desired shape of the end product. The different rubber mixtures flow from the two flow passages 2, 3 into the pre-templet 4. The exit opening of the upper flow passage 2 from the pre-templet 4 is sealed against the exit opening of the other flow passage 3 by means of a protrusion 7 which is provided at the pre-templet 4 and the edges 7' of which widen toward the passage exit from the pre-templet 4. The protrusion 7 has the shape of a triangle the tip 8 of which is directed counter to the flow of the rubber mixture from the lower flow passage 3. This surface seal prevents an uncontrolled entry of the rubber mixture for the lateral portions 9 into the rubber mixture of the upper flow passage 2. A sharp deviation or diversion of the flow threads 10 is prevented by the triangular course of the edges 7'. The flow threads 10 are gradually deviated into the direction of the lateral openings 11 in the pre-templet 4. In the plane of the pre-templet 4, at both sides of said pre-templet, there are provided insert members 12 the outer confining surfaces 13 of which converge in the direction toward the pre-templet exit. As a result thereof, the flow threads 10 are gradually diverted into the outer ranges of the pre-templet 4 and are conditioned to the flow of the upper flow passage in such a way that the lateral portions 9 as well as the tread strip 14 will be joined at the seams 15 at approximately equal flow velocities.

The undesired passage of the injection material for the lateral portions 9 from the lower flow passage 3 into the upper flow passage 2 can additionally be prevented by a substantially angular blocking strip 16. This blocking strip 16 simultaneously serves for connecting the pre-templet 4 to the injection head. The final shaping of the tire tread strip is effected in the finish-templet 5 arranged ahead of the pre-templet 4. The final cross-section of the finish-injected tire tread strip is illustrated by dash lines 17 (FIG. 1). The pre-templet 4 may be employed for a plurality of different tread strip profiles within a certain range of sizes so that, when changes in said profile are desired, it is merely necessary to exchange the finish-templet 5.

It is, of course, to be understood that the present invention is, by no means, limited to the particular showing in the drawings but also comprises modifications within the scope of the appended claims.

What we claim is:

1. An extrusion head for articles of rubber or rubber-like materials, which has a plurality of adjacent strands of different materials respectively, which includes: a main member having first passage means for conveying centrally therethrough a first mixture of rubber material and also having second passage means angularly superimposed for conveying therethrough simultaneously a second side mixture of rubber material, each of said passage means having its cross section from the inlet to the outlet thereof steplessly decreasing in one dimension and increasing in the other dimension, finish-templet means secured to said extrusion head in spaced relationship to said outlets of said first and second passage means and provided with passage means therethrough having a central section and also having lateral sections on opposite sides of said central section, and pre-templet means detachably interposed between and adjacent to said finish-templet means and also adjacent to said first and second passage means and comprising passing means for passing material transmitted to said first and second passage means respectively to said central section and also to said lateral sections.

2. An extrusion head according to claim 3, in which said pre-templet means has its passing means so dimensioned as to be useable with a series of finish-templet means with differently dimensioned passage means.

3. An extrusion head for articles of rubber or rubber-like materials, which has a plurality of adjacent strands of different materials respectively, which includes: a main member having first passage means for conveying therethrough a first mixture of rubber material and also having second passage means for conveying therethrough a second mixture of rubber material, each of said passage means having its cross section from the inlet to the outlet thereof steplessly decreasing in one dimension and increasing in the other dimension, finish-templet means secured to said extrusion head in spaced relationship to said outlets of said first and second passage means and provided with passage means therethrough having a central section and also having lateral sections on opposite sides of said central section, pre-templet means detachably interposed between and adjacent to said finish-templet means and also adjacent to said first and second passage means and comprising passing means for passing material transmitted to said first and second passage means respectively to said central section and also to said lateral sections, and exchangeable insert members arranged on both sides of said pre-templet means in the plane thereof and located between the outlets of said first and second passage means and said finish-templet means, said insert members being provided with passages therethrough communicating with said second passage means.

4. An extrusion head according to claim 3, in which the passages of said insert members steplessly decrease in cross section in a direction away from said pre-templet means.

5. An extrusion head according to claim 3, in which said pre-templet means includes means preventing the flow of material of said second passage means from mixing with the flow of material passing from said first passage means through said pre-templet means.

6. An extrusion head according to claim 5, in which said means preventing the flow of material of said second passage means from mixing with the flow of material passing from said first passage means through said pre-templet means is of triangular shape and cross section with the tip of the triangle pointing in counter flow direction of the material coming from said second passage means.

7. An extrusion head according to claim 3, in which said pre-templet means is provided with a substantially angular blocking bar.

References Cited

UNITED STATES PATENTS

| | | | |
|---|---|---|---|
| 2,569,373 | 9/1951 | Fay | 18—13 |
| 2,897,543 | 8/1959 | Weston et al. | 18—13 |
| 3,280,427 | 10/1966 | Smith | 18—13 |
| 3,486,195 | 12/1969 | Greenwood et al. | 18—13 |

WILLIAM S. LAWSON, Primary Examiner